United States Patent [19]

Woodbridge

[11] Patent Number: 4,759,233

[45] Date of Patent: Jul. 26, 1988

[54] TRANSMISSION SYSTEMS FOR VEHICLES HAVING A SPIN CONTROLLED DIFFERENTIAL

[76] Inventor: Samuel A. T. Woodbridge, 85 Bunya Street, Greenslopes, Queensland 4120, Australia

[21] Appl. No.: 800,126

[22] PCT Filed: Mar. 13, 1985

[86] PCT No.: PCT/AU85/00048

§ 371 Date: Oct. 24, 1985

§ 102(e) Date: Oct. 24, 1985

[87] PCT Pub. No.: WO85/04229

PCT Pub. Date: Sep. 26, 1985

[30] Foreign Application Priority Data

Mar. 13, 1984 [AU] Australia ............... PG4042
Aug. 27, 1984 [AU] Australia ............... 32466/84

[51] Int. Cl.⁴ .................... F16H 1/44; F16H 37/08
[52] U.S. Cl. .................................. 74/711; 74/701
[58] Field of Search ............... 74/701, 710, 710.5, 74/711, 713, 714, 665 F, 665 G, 665 GC, 665 GE, 665 Q, 340, 321; 192/94, 51, 21, 20

[56] References Cited

U.S. PATENT DOCUMENTS

| | | | |
|---|---|---|---|
| 1,459,026 | 6/1923 | Kocher | 74/701 |
| 2,192,439 | 3/1940 | Gustafson | 192/51 |
| 2,635,726 | 4/1953 | Benjamin | 192/21 |
| 2,709,927 | 6/1955 | Van Meter | 74/711 |
| 2,791,771 | 5/1957 | Schou | 74/701 |
| 2,805,586 | 9/1957 | Lucas | 74/710.5 |
| 3,034,322 | 5/1962 | Miller | 74/711 |
| 3,095,759 | 7/1963 | Herrod | 74/701 |
| 3,397,595 | 8/1968 | Roach | 74/710.5 |
| 4,143,747 | 3/1979 | Langieri, Jr. et al. | 192/94 |
| 4,280,375 | 7/1981 | Goscenski, Jr. | 74/711 |

FOREIGN PATENT DOCUMENTS

| | | |
|---|---|---|
| 120504 | 11/1945 | Australia . |
| 203934 | 4/1907 | Fed. Rep. of Germany ........ 74/711 |
| 3214488 | 3/1983 | Fed. Rep. of Germany . |
| WO83/01494 | 4/1983 | PCT Int'l Appl. . |

*Primary Examiner*—Leslie A. Braun
*Assistant Examiner*—David Novais
*Attorney, Agent, or Firm*—Kimmel, Crowell & Weaver

[57] ABSTRACT

A transmission system (12) for a vehicle has a differential assembly with a pair of output shafts (18) connected to front and rear differentials, or wheels, respectively of the vehicle. A control unit (26) is provided to control the slip of each output shaft (18) relative to the rotational speed of the differential assembly, each control unit being overdriven at the maximum allowable speed of the output shafts (18) relative to the differential assembly. Each control unit (26) has a sliding gear (30) engaged on a control shaft (24) and is engageable with teeth (33) on the ends of the housing (31) of the control unit to releasably lock the output shaft (18) to the control unit (26).

12 Claims, 4 Drawing Sheets

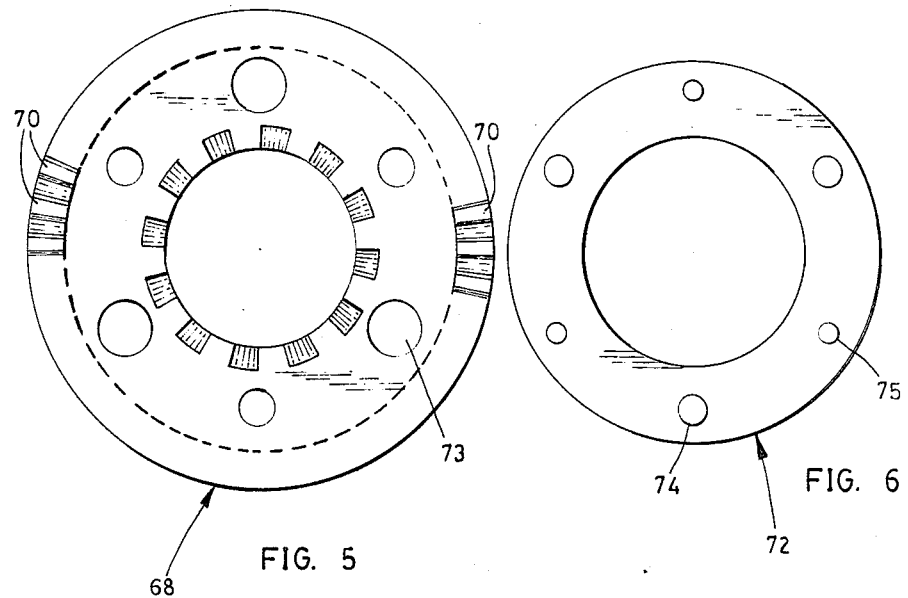
FIG. 5
FIG. 6
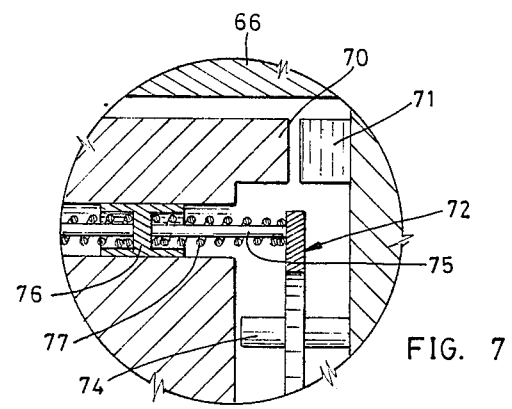
FIG. 7
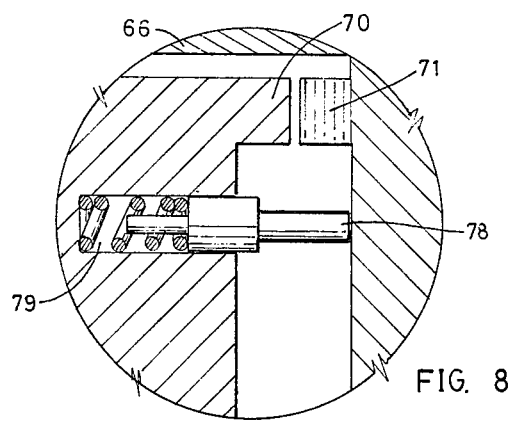
FIG. 8

TRANSMISSION SYSTEMS FOR VEHICLES HAVING A SPIN CONTROLLED DIFFERENTIAL

BACKGROUND OF THE INVENTION (1) Field of the Invention

This invention relates to a transmission system for vehicles.

(2) Prior Art

In four wheel drive (4WD) and certain conventional drive vehicles, it is required that at least one driving wheel has traction when one or more of the other driving wheels begin to spin to enable the vehicle to continue to move. Locked differentials provide the necessary type of drive but make cornering difficult (or almost impossible), while the limited slip differentials (LSD) presently available have proved generally unsatisfactory in practice.

With four wheel drive vehicles, the problem of "differential wind-up" is also of concern as the front wheels must rotate upto e.g. 25% faster than the rear wheels when turning on full lock as they travel around greater radii.

SUMMARY OF THE PRESENT INVENTION

It is an object of the present invention to provide a transmission system which can be used to control wheel spin between a pair of wheels on an axle.

It is an alternate object of the present invention to provide a transmission system which can be used to overcome "differential wind-up" between the differentials of a four wheel drive (4WD) or multiple wheel drive vehicle.

It is a preferred object to provide such a system where the difference in speed between the wheels or differentials can be preset.

It is a further preferred object to provide a transmission system which may provide a multiple ratio transfer case/third differential for four wheel drive vehicles.

Other preferred objects will become apparent from the following description.

In one aspect the present invention resides in a transmission system for vehicles including:
an input shaft;
a differential having a pair of output shafts;
drive means interconnecting the input shaft and the differential;
a control unit driven by the input shaft or differential at a rotational speed not less than the rotational speed of the differential;
at least one control shaft in the control unit driven by at least one output shaft at a rotational speed of the control unit to prevent further increase in speed in that output shaft and to cause drive to continue to be applied to the other output shaft.

In one embodiment, the system may have a control unit with a pair of central shafts independently driven by the respective output shafts. In a second embodiment, the system has a pair of control units each with a single control shaft driven by a respective one of the output shafts.

In a third embodiment, the control shafts are formed integrally with the output shafts.

The input shaft may be connected to the output shaft of a gearbox when the system provides the transfer case/third differential for a four wheel drive (4WD) vehicle, to a propeller shaft when provided as the differential for one of the axles of a vehicle, or to an output shaft of a transfer case.

The input shaft may be connected directly to the differential by gears (e.g. the input pin or gear and crown wheel) or chains, or indirectly via the control unit, and a plurality of ratios may be provided by respective gear sets or chains having respective dog clutches e.g. on the input shaft to provide high and low ranges.

The control unit may be over-driven by e.g. 112% or 120% relative to the differential to limit the overspeeding of either output shaft to e.g. 112% or 120%, respectively, of the rotational speed of the differential unit and the control shafts of the control unit are preferably connected to the outputs shafts by gears in a 1:1 ratio. Alternatively the control unit may be driven at the same speed as the differential and the control shafts driven from the output shafts by reduction gears. The control unit may be driven by gears from the differential or via a worm/screw drive from the input pinion shaft of the differential.

The control unit may include a pair of couplings, having respective sliding gears to interconnect the control shafts and the body of the control unit, of the type described in my International Application No. PCT/AU82/00170 published on the 23rd Apr., 1983 under International Publication No. WO83/01494, the angle of the teeth being in the range of 0° to 90°.

Alternatively, the sliding gear with external teeth may be replaced by a sliding gear with sinusoidal, wave-like or saw-teeth or other suitably profiled side teeth which engage complementary teeth at the ends of the body of the control unit or a multiple plate clutchpack with interleaved clutch platges or coned clutches keyed onto the control shafts and the body.

In a further alternative, an electronic circuit may sense the relationship between the control shafts and the body of the control unit to use solenoids or electromagnets to engage and release the sliding gears or clutchpacks.

To prevent inadvertent engagement of the sliding gears with the body of the control unit when the vehicle is stopped, selectively operating means (e.g. spring loaded arms or plungers or mechanical control rings) may be provided on the sliding gears and/or the body.

BRIEF DESCRIPTION OF THE DRAWINGS

To enable the invention to be fully understood, a number of preferred embodiments will now be described by way of the accompanying drawings in which:

FIG. 5 is a side view of the sliding gear;

FIG. 6 is a schematic side view of a control ring fitted to one of the sliding gears;

FIG. 7 is an enlarged view of a portion of the sliding gear and control rings showing the operation of the latter; and FIG. 8 is a similar view of a spring loaded plunger assembly which can be used to control the sliding gear.

DETAILED DESCRIPTION OF THE PREFERRED EMBODIMENTS

Figure 1:
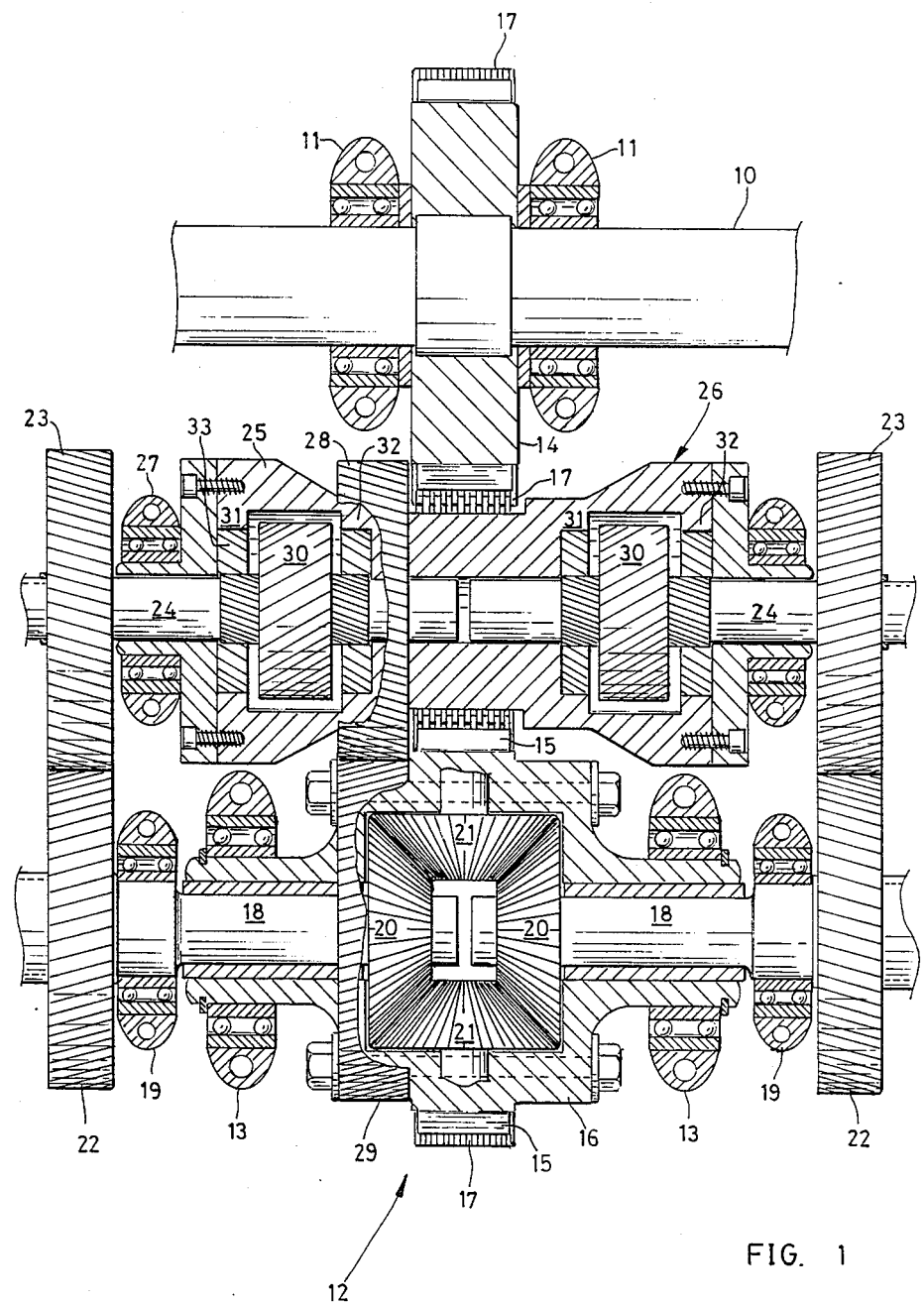
FIG. 1 is a schematic view of a transfer case/ third differential for a four wheel drive (4WD) vehicle.
Figure 2:
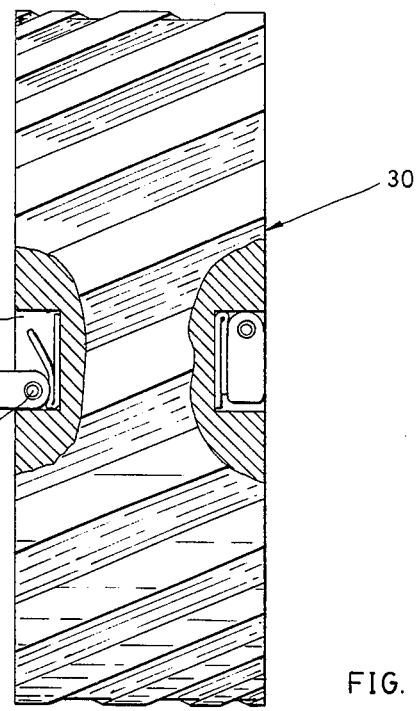
FIG. 2 is a side view of a modified sliding gear for the control unit.

Referring to FIG. 1, an input shaft 10 is journalled in the casing (not shown) of the transfer case/third differential assembly by bearings 11, the shaft being operatively connected to a gearbox (not shown).

A differential assembly 12 is also rotatably mounted in the casing on suitable bearings 13 and a driving sprocket 14 on the input shaft 10 is connected to a similar driver sprocket 15 on the differential housing 16 via a silent chain 17 e.g. of the "HyVo" type. (For a dual ratio system, a pair of driving sproket 14/driver sprocket 15/chain 17 assemblies are provided, the sprocket pairs being of different ratios and the driving sprockets having selectively engageable dog clutches on the input shaft).

The differential assembly has a pair of output shafts 18 each journalled in the casing by bearings 19, the output shafts 18 being connected to the front and rear axles (not shown) by suitable propellor shafts (also not shown). A side gear 20 is provided at the inner end of each output shaft 18 and the side gears 20 mesh with opposed pinion gears 21.

A driving control gear 22 is provided on each output shaft 18 and each gear meshes with a driven control gear 23 on a respective control shaft 24 rotatably journalled in the body 25 of the control unit assembly 26. The body 25 of the control unit assembly has a reduced diameter central portion to provide clearance from the chain 17 and is journalled in suitable bearings 27 in the casing and is driven by a driven gear 28 which meshes with a driving gear 29 on the differential housing 16. The gears 28, 29 are selected so that the control unit body 25 is overdriven by 120% relative to the differential housing 16 (i.e. a ratio of 6:5).

The control shafts 24 are each splined and carry a sliding gear 30 (with teeth at an angle of 68°) which is operable to engage teeth 31, 32 at each end of the respective housings 33 in the body 25 in the manner described in my International Application referred to above.

The operation of the system will now be described.

As the vehicle proceeds forwards in a straight line, the input shaft 10 drives the differential housing 16 via the silent chain 17.

The pinion gears 21 do not rotate and so each output shaft 18 rotates at the same speed.

The contorl shafts 24 rotate at the same speed as the output shafts 18 but as the body 25 of the control unit 26 is rotating faster, the sliding gears 30 remain disengaged from the teeth 31, 32.

Assuming that the left hand output shaft 18 is connected to the differential of the front axle of a four wheel drive (4WD) vehicle, it will rotate faster than the right hand output shaft 18 connected to the rear axle differential when the vehicle is turning, the pinion gears 21 rotating in the differential housing 16 to accommodate the difference.

When the left hand output shaft reaches a speed equal to 120% of the differential housing 16, the left hand control shaft 24 will be rotating at the same speed as the control unit body 25 and the sliding gear 30 will move along the shaft to engage the teeth 32.

When this occurs, the left hand output shaft 18 is locked to the control unit 26 and cannot rotate any faster and so the other output shaft 18 continues to receive drive at a speed of 80% of the rotational speed of the differential housing 16.

When the vehicle begins to straighten up, the rotational speed of the left hand output shaft 18 is reduced and the sliding gear 30 becomes disengaged from the teeth 32.

If the wheels on either axle should slip, the respective output shaft 18 will be locked to the control unit 26 when the propellor shaft to that axle overspeeds by e.g. 120%.

It will be readily apparent to the skilled addressee that when the system is used as a differential for a vehicle axle, each output shaft 18 is connected to a respective wheel, either wheel can only slip upto a preset amount relative to the other wheel and the latter will always be driven, albeit at a lower speed.

As hereinbefore described the control unit 26 could be driven from the input shaft 10 and in turn drive the differential housing by a gear train where the gears on the input shaft 10, control unit 26 and differential housing 16 are in the ratio 6:5:6 so that the control unit is over driven to 120% of the speed of the other units.

When the system is used in the differential for an axle, a screw is preferably provided about the body 25 of the control unit 26 to be driven by a worm in the input pinion shaft to the differential assembly 12.

In certain applications e.g. where the vehicle suddenly stops at the end of a turn, the kinetic energy of the sliding gears 30 may be sufficient to cause the sliding gears, on disengagement with the teeth 31, 32 to move to the other end of the control body 25 and engage the opposed teeth 32, 31 locking up the transmission until the vehicle is reversed.

Figure 3:
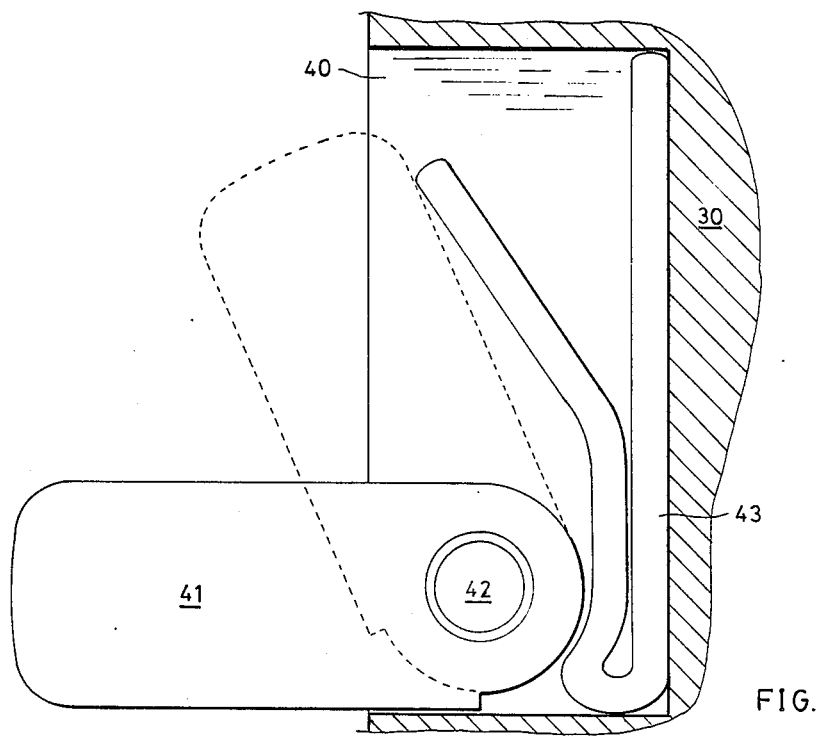
FIG. 3 is a sectional view of a portion of the sliding gear on an enlarged scale.
Figure 4:
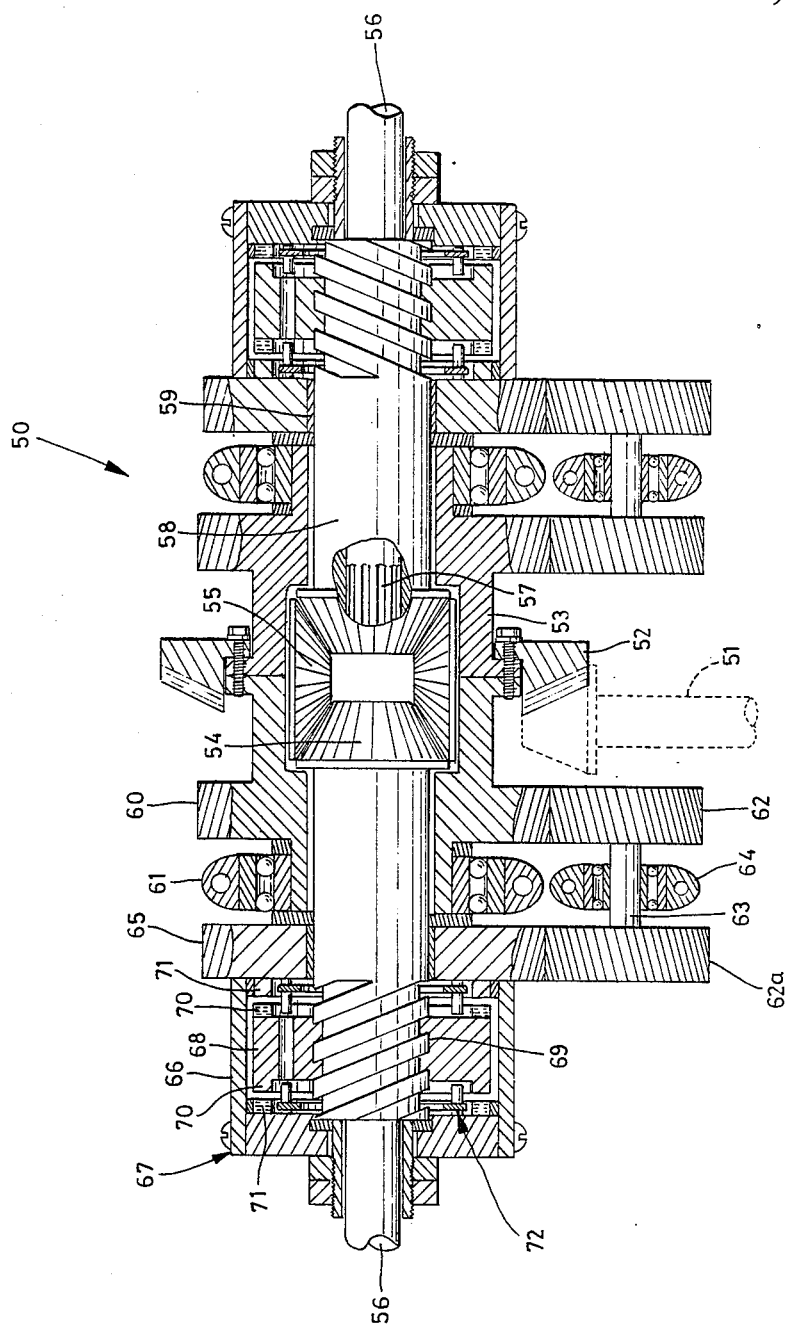
FIG. 4 is a schematic view of a spin-limiting differential for a vehicle.

To overcome the problem, recesses 40 may be provided in the side faces of the sliding gears 30. Small flaps or fingers 41 are loosely hingedly mounted in the recesses 40 on pins 42, the flaps on one side face being arranged oppositely to those on the other side face. A spring 43 is provided behind to urge the flap 41 to the partially extended position shown in dashed lines in FIG. 3.

As the sliding gear rotates, the flaps 41 on the advancing side face are thrown outwardly to the extended position shown in solid lines, the flaps on the other side face remaining retracted, due to centrifugal force. The flaps 41 on the advancing side face engage the adjacent housing 33 in the body 25 and prevent engagement of the sliding gears 30 with the teeth 31, 32.

When the vehicle is restarted, the inertia of the sliding gears 30 as it moves in the opposite direction is so small and the speed of rotation so slow, that the flaps 41 on the other side face do not extend to prevent proper engagement of the sliding gear 30 with the teeth 31, 32. The flaps 41 also provide another function in that on starting the vehicle, they disturb and catch the lubricating oil to retard rotating motion of the sliding gear and so assist the sliding motion of the gear into engagement with the teeth 31, 32.

As an alternative, a control ring (not shown) having teeth engageable with the control shaft teeth, may be provided on each side of the sliding gear, the rings being non-slidably engaged with the control shaft 24 when the control unit is rapidly stopped to prevent the sliding gear moving along the control shaft to engage the teeth 31, 32.

In an embodiment not shown, this resistance to the initial rotation of the sliding gear may be assisted by a spring loaded ball in the control body 25 which engages the teeth on the sliding gear.

If required, locks may be provided on the control body to releasably engage a circumferential slot on the sliding gear to lock the sliding gear out of engagement with the teeth 31, 32 to override the control unit assembly 26.

In a further embodiment of the invention used in a differential assembly 50, an input pinion 51 drives a crown wheel 52 fixed to the two-part cage 53 of the differential assembly provided with the side gears 54 and pinion gears 55 inthe manner hereinbefore described. The output shafts 56 of the differential are provided with splines 57 which engage corresponding splines (not shown) in the tubular extension 58 of the side gear 54, the extension being supported in suitable bushes 59.

Integral driving gears 60 are provided around each end of the case 53, the latter being supported in bearings 61.

Each driving gear 60 engages an idler gear 62 at one end of an idler shaft 63 supported in bearings 64. A second idler gear 63a engages a driven gear 65 on the housing 66 of the control unit 67 for the respective output shaft 56.

A sliding gear 68 is provided in each control unit 67, engaged with helical threads 69 on the output shaft 56 (which also acts as the control shaft for the control unit) and teeth 70 on the side faces of the sliding gear 68 engage complementary teeth 71 on the end faces of the housing 66.

The gears 60, 62, 62a, 65 have their teeth selected to overdrive the housing 66 of the control unit 67 at 112% of the rotational speed of the differential assembly. When a wheel connected to one of the output shafts 56 begins to slip, the rotational speed of the output shaft 56 increases until at 112% of the rotational speed of the cage 53, the sliding gear 68 engages the housing to lock the output shaft thereto. Simultaneously, the side gear 54 and pinion gear 55 reduce the rotational speed of the other output shaft. Drive is always maintained to this output shaft, while the first output shaft cannot exceed e.g. 112% of the rotational speed of its case 53.

To prevent inadvertent engagement of the sliding gear 58 with the teeth 71 in the housing, a control ring 72 (see FIG. 6) is provided on each side of the sliding gear 68, the latter having a plurality of equally spaced holes 73 (see FIG. 5) at e.g. 60° spacings. A plurality of dowels 74 extend through the contorl rings spaced e.g. 120° apart around the ring. A set of pins 75 extend inwardly from the control ring 72 and are engaged with a sliding block 76 within the respective holes 73 in the sliding gear, coil springs 77 being interposed between the block 76 and the control rings 72. Each pin 75 is spaced e.g. 52.5° from a respective dowel 74 and the pins are dimensional to allow 15° rotational movement of the control rings 72 relative to the sliding gear 68 so that the dowels 74 can either enter respective holes 73 in the sliding gear 68, to enable engagement of it with the teeth 71 or the housing 66, or engagement with the side faces of the sliding gear to prevent such engagement.

When the vehicle suddenly stops, the inertia of the sliding gear 68 will cause it to rotate so that the control rings 72 lag behind it. In this position, the dowels 74 cannot enter the holes 73 and engagement of the sliding gear 68 with the teeth 71 is prevented.

In an alternative form to control engagement of the sliding gear 68 with the teeth 71 (see FIG. 8) spring loaded plungers 78 are provided within bores 79 (replacing the holes 73) in the side faces of the sliding gear 68 to engage the end faces of the housing to prevent the engagement of the sliding gear 68 with the teeth, the plungers 69 being over-ridden in normal operation when output shaft 56 slips to cause engagement of the sliding gear 68 with the teeth.

Various changes and modifications may be made to the embodiments described without departing from the scope of the invention defined in the appended claims.

I claim:

1. A transmission system for vehicles including:
   an input shaft;
   a differential having a pair of output shafts;
   drive means interconnecting the input shaft and the differential;
   a control unit connected to be driven by one of the input shaft and differential at a rotational speed not less than the rotational speed of the differential;
   control shaft means operatively connected with the output shafts to be driven thereby;
   control drive means operatively connected with the control shaft means to be driven thereby and including means for connecting and disconnecting the output shafts for rotation with the control unit, said means being normally disengaged from the control unit when the vehicle is moving straight ahead for enabling each output shaft to rotate at the same speed, and said control drive means being movable relative to the control shaft means to engage the control unit when the difference in rotational speed between that output shaft and the control unit reaches a predetermined value as the vehicle is turning, or a wheel associated with that output shaft slips, or the like, while at the same time, the control drive means associated with the other control shaft and associated output shaft remains disengaged from the control unit, thereby locking said one output shaft to the control unit and limiting its rotational speed, while the other output shaft continues to remain disengaged from the control unit and to receive drive proportional to the rotational speed of the differential, thus ensuring that there will be no more than a predetermined maximum difference in the rotational speeds between the output shafts and that both output shafts will always be driven.

2. A system as claimed in claim 1 wherein:
a single control unit has a pair of control shafts independently driven by the respective output shafts.

3. A system as claimed in claim 1 wherein:
a pair of control units each have a single control shaft driven by a respective one of the output shafts.

4. A system as claimed in claim 3 wherein:
the control shafts are integral with the output shaft.

5. The system as claimed in claim 3 wherein:
both control units are driven at a rotational speed greater than the rotational speed of the differential at a ratio equal to the maximum overdriven ratio of one of the output shafts to the differential and both control shafts are driven at the same rotational speed as the differential.

6. The system as claimed in claim 1 wherein:
the input shaft is connected directly to the differential.

7. The system as claimed in claim 1 wherein:

the input shaft is connected indirectly to the differential by a multiple-speed ratio transmission.

8. A transmission system for vehicles including:
an input shaft;
a differential having a pair of output shafts;
drive means interconnecting the input shaft and the differential;
a control unit driven by the input shaft at a rotational speed not less than the rotational speed of the differential, said control unit comprising a pair of housings each having teeth at each end and having a pair of control shafts independently driven by the respective output shafts, said control shafts being rotatably journalled in a respective housing and driven by a respective output shaft at a rotational speed not greater than the rotational speed of the output shaft; and
means to engage at least one of the control shafts with the control unit when one of the output shafts is rotating at substantially the rotational speed of the control unit to prevent further increase in speed in that output shaft and to cause drive to continue to be applied to the other output shaft, said means comprising a sliding gear on each control shaft having internal teeth in engagement with teeth around the control shaft and external teeth engageable with the teeth in the housing to couple the control shaft to the housing when the sliding gear moves to either end of the control shaft.

9. A system as claimed in claim 8 wherein:
hinged flaps are provided on side faces of the sliding gear, the flaps being extendable by centrifugal force to prevent engagement of the sliding gear with the teeth on the housing when rotation of the control units is rapidly stopped.

10. A transmission system for vehicles including:
an input shaft;
a differential having a pair of output shafts;
drive means interconnecting the input shaft and the differential;
a pair of control units driven by the input shaft at a rotational speed not less than the rotational speed of the differential, each control unit comprising a body having a housing with a single control shaft rotatably journalled in the housing and driven by a respective one of the output shafts at a rotational speed not greater than the rotational speed of the output shaft; and
means to engage the control shafts with a respective control unit when the associated output shaft is rotating at substantially the rotational speed of the control unit to prevent further increase in speed in that output shaft and to cause drive to continue to be applied to the other output shaft, said means comprising teeth at each end of each housing, and a sliding gear having internal teeth in engagement with teeth around the control shaft and external teeth engageable with the teeth in the housing to couple the control shaft to the housing when the sliding gear moves to either end of the control shaft.

11. A system as claimed in claim 10 wherein:
holes are provided on side faces of the sliding gear; and
a respective control ring is provided adjacent each side face, each control ring having at least one first pin entering the holes for limiting rotational movement of the control ring relative to sliding gear and at least one second pin operably to selectively enter one of the holes dependent on the rotational relationship of the control ring to the sliding gear, so arranged that when rotation of the control units is rapidly stopped, the control rings ar moved relative to the sliding gear to prevent the second pins entering the holes and so preventing engagement of the sliding gear with the teeth on the housing.

12. A system as claimed in claim 10 wherein:
a plurality of spring loaded plungers are provided in side faces of the sliding gear and/or end faces of the housing, so arranged that when rotation of the control units is rapidly stopped, engagement of the teeth on the sliding gear with the teeth on the housing is prevented.

* * * * *